(12) United States Patent
Minogue et al.

(10) Patent No.: US 9,721,226 B2
(45) Date of Patent: Aug. 1, 2017

(54) METHOD AND SYSTEM FOR SPECIALIZED HANDLING OF PACKAGES

(71) Applicant: Fisher Clinical Services Inc., Allentown, PA (US)

(72) Inventors: Gregory Alan Minogue, Orefield, PA (US); Sean Leslie Smith, West Sussex (GB)

(73) Assignee: Fisher Clinical Services Inc., Allentown, PA (US)

( * ) Notice: Subject to any disclaimer, the term of this patent is extended or adjusted under 35 U.S.C. 154(b) by 974 days.

(21) Appl. No.: 13/956,972

(22) Filed: Aug. 1, 2013

(65) Prior Publication Data

US 2015/0039528 A1    Feb. 5, 2015

(51) Int. Cl.
*G06Q 10/08*    (2012.01)

(52) U.S. Cl.
CPC ......... *G06Q 10/0832* (2013.01); *G06Q 10/08* (2013.01)

(58) Field of Classification Search
None
See application file for complete search history.

(56) References Cited

U.S. PATENT DOCUMENTS

| | | |
|---|---|---|
| 5,038,283 A | 8/1991 | Caveney |
| 5,646,389 A | 7/1997 | Bravman et al. |
| 5,712,989 A | 1/1998 | Johnson et al. |
| 5,831,859 A | 11/1998 | Medeiros et al. |
| 6,023,683 A | 2/2000 | Johnson et al. |
| 6,430,457 B1 | 8/2002 | Van De Loo |
| 6,539,360 B1 | 3/2003 | Kadaba |
| 6,766,956 B1 | 7/2004 | Boylan, III et al. |
| 7,313,537 B1 | 12/2007 | Burrell et al. |

(Continued)

FOREIGN PATENT DOCUMENTS

| | | |
|---|---|---|
| WO | 0203164 A2 | 1/2002 |
| WO | 0203165 A2 | 1/2002 |

OTHER PUBLICATIONS

International Searching Authority, International Search Report and Written Opinion issued in International Application No. PCT/US2014/49168 dated May 1, 2015.

(Continued)

*Primary Examiner* — Kristy A Haupt
(74) *Attorney, Agent, or Firm* — Wood Herron & Evans LLP

(57) ABSTRACT

Methods and systems for providing information relating to the specialized handling of a package, and articles contained within the package. Data relating to a package containing an article that requires specialized handling is associated with a unique identifier and stored in a database. The unique identifier is also included in a machine readable code affixed to the package. A recipient of the package scans the machine readable code using an application downloaded into a mobile device, which extracts the unique identifier from the machine readable code and transmits a request to the database. The database may then identify data stored in the database that relates to the article based on the unique identifier, and transmit the data to the mobile device for display to the recipient. The data may include instructions on how to unpack the package, and how to store or use articles contained within the package.

30 Claims, 12 Drawing Sheets

(56) References Cited

U.S. PATENT DOCUMENTS

| | | |
|---|---|---|
| 7,596,508 B1 | 9/2009 | McGuffie et al. |
| 7,689,465 B1 | 3/2010 | Shakes et al. |
| 7,769,221 B1 | 8/2010 | Shakes et al. |
| 7,823,778 B1 | 11/2010 | Singh et al. |
| 7,878,329 B1 * | 2/2011 | McCarron ............ B65D 5/5047 206/521 |
| 7,938,326 B2 | 5/2011 | Dearing et al. |
| 8,086,546 B2 | 12/2011 | Spiegel et al. |
| 8,154,421 B2 | 4/2012 | Saltzman et al. |
| 8,156,013 B2 | 4/2012 | Dearlove et al. |
| 8,175,935 B2 | 5/2012 | Dearlove et al. |
| 8,219,463 B2 | 7/2012 | Dearlove et al. |
| 8,260,656 B1 | 9/2012 | Harbick et al. |
| 8,266,017 B1 | 9/2012 | Dearlove et al. |
| 8,271,398 B2 | 9/2012 | Spiegel et al. |
| 8,306,862 B2 | 11/2012 | Weiler et al. |
| 8,355,963 B2 | 1/2013 | Sicard |
| 8,615,473 B2 | 12/2013 | Spiegel et al. |
| 2003/0200155 A1 | 10/2003 | Ouchi |
| 2004/0148052 A1 | 7/2004 | Ferguson et al. |
| 2004/0243460 A1 | 12/2004 | Dogan et al. |
| 2005/0114219 A1 | 5/2005 | Sultan |
| 2006/0007304 A1 | 1/2006 | Anderson |
| 2006/0273167 A1 * | 12/2006 | Baldassari ............... B07C 3/10 235/385 |
| 2006/0282345 A1 | 12/2006 | Nelson |
| 2007/0150361 A1 | 6/2007 | Kreiner et al. |
| 2007/0198297 A1 | 8/2007 | Perkins et al. |
| 2007/0203808 A1 | 8/2007 | Sekimoto et al. |
| 2008/0140432 A1 | 6/2008 | Fenn |
| 2008/0183599 A1 | 7/2008 | Hill et al. |
| 2009/0101281 A1 | 4/2009 | Sacherer |
| 2009/0125411 A1 | 5/2009 | Otto et al. |
| 2010/0268659 A1 | 10/2010 | Zimberoff et al. |
| 2011/0029344 A1 | 2/2011 | Weiler et al. |
| 2011/0173041 A1 | 7/2011 | Breitenbach et al. |
| 2012/0179621 A1 * | 7/2012 | Moir .................. G01G 23/3735 705/332 |
| 2012/0232942 A1 | 9/2012 | Gaug et al. |
| 2012/0271777 A1 | 10/2012 | Kadaba |
| 2013/0018356 A1 | 1/2013 | Prince et al. |
| 2013/0346186 A1 | 12/2013 | Bezos et al. |

OTHER PUBLICATIONS

Health Industry Business Communications Council, The Health Industry Bar Code (HIBC) Supplier Labeling Standard, ANSI/HIBC 2.3-2009 (38 pages).

ASAP Systems, Live Chat (Offline), Industry Solutions, Chemical and Drum Tracking, retrieved from www.asapsystems.com/chemical.php on Apr. 19, 2013 (3 pages).

Tedia High Purity Solvents, Customer Letter, Mar. 22, 2012 (3 pages).

* cited by examiner

METHOD AND SYSTEM FOR SPECIALIZED HANDLING OF PACKAGES

FIELD OF THE INVENTION

The present invention relates generally to methods and systems for managing packages requiring special handling and, more particularly, to methods and systems for providing special handling instructions to recipients of the packages.

BACKGROUND OF THE INVENTION

Certain industries and fields of endeavor, such as clinical studies of pharmacological products, sometimes require that articles be shipped with special handing. The viability, metabolic state (e.g., active/dormant), life span, or other properties of these articles are dependent on proper handling both during shipment and after reception of the article. For example, vaccines, cell cultures, vials of injectable drugs, drugs including complex molecules in liquid form, and many other materials must typically be kept within a range of temperatures to remain viable and/or active. It may also be necessary to unpack articles requiring special handling within a limited amount of time and under specific environmental conditions to prevent damage to, or contamination of, the article. Thus, special handling requirements may extend to how the package is treated at the receiving end. Packages may also contain clinical trial samples, in which case it may also be necessary for the recipient to track and distribute the articles in the package in a proscribed manner to preserve the integrity of clinical trial results.

Packages requiring special handling may also include a tracking device that collects data on environmental conditions during shipment. For example, a tracking device may be included in the package that monitors the temperature of an article in the package to determine if the article may have been damaged because it was not kept sufficiently cool during shipment. When a tracking device is included in the package, it may also be necessary for the tracking device to be deactivated and its data retrieved as part of the receiving process.

Because packages containing articles requiring special handling typically have specific time sensitive needs with regard to how they are handled at the receiving end, it is important that the recipient know any special processing instructions at the time the article is delivered. However, packages that require special handling at the receiving end may arrive with other packages that do not require special handling. Moreover, because the requirements for handling each package may differ, there is a danger that the receiving party will handle the package improperly, or not realize that the package requires special handling, resulting in damage to or loss of the package contents. This can be especially problematic for pharmaceutical testing facilities, which typically receive multiple shipments from multiple sources per day, with each shipment including packages related to different clinical studies.

Thus, there is a need for improved methods and systems of tracking and receiving packages requiring special handling, of providing handling instructions for these packages, and for reducing the potential for improper handling of the packages.

SUMMARY OF THE INVENTION

The present invention overcomes the foregoing problems and other known shortcomings, drawbacks, and challenges of providing specialized handling of packages in a complex distribution and/or use environment. While the present invention will be described in connection with certain embodiments, it will be understood that the present invention is not limited to these embodiments. To the contrary, the present invention includes all alternatives, modifications, and equivalents as may be included within the spirit and scope of the present invention.

In one embodiment of the present invention, a method is provided for providing instructions for handling a package requiring specialized handling. The method includes storing data relating to the instructions for handling the package in a database, and associating a unique identifier that identifies the package with the data stored in the database. The method further includes associating a machine readable code including the unique identifier with the package. In response to the machine readable code being scanned by a scanning device, the data relating to the instructions for handling the package is transmitted from the database to a data receiving device.

In another embodiment of the present invention, a system is provided for providing instructions for handling a package requiring specialized handling. The system includes a processor and memory including program code. The program code is configured so that when the code is executed by the processor, the code causes the processor to store data relating to the instructions for handling the package in a database and associate a unique identifier identifying the package with the data stored in the database. The code is further configured to cause the processor to provide a machine readable code associated with the package that includes the unique identifier. In response to the machine readable code being scanned by a scanning device, the program code further causes the processor to transmit the data relating to the instructions for handling the package from the database to a data receiving device.

In yet another embodiment of the present invention, a machine code reading device is provided that includes a processor and memory including program code. The program code is configured so that when the code is executed by the processor, the code causes the processor to scan and extract data from a machine readable code. The extracted data may include a unique identifier and data identifying a communication link to a database. The code may further cause the processor to transmit the unique identifier to the database via the communication link, and receive a response from the database that includes data associated with the unique identifier relating to instructions on handling a package. The code may further cause the processor to display at least a portion of the data relating to the handling of the package on a user interface of the machine code reading device.

BRIEF DESCRIPTION OF THE DRAWINGS

The accompanying drawings, which are incorporated in and constitute a part of this specification, illustrate embodiments of the present invention and, together with a general description of the present invention given above, and the detailed description of the present invention given below, serve to explain the principles of the present invention.

DETAILED DESCRIPTION OF THE INVENTION

Figure 1:
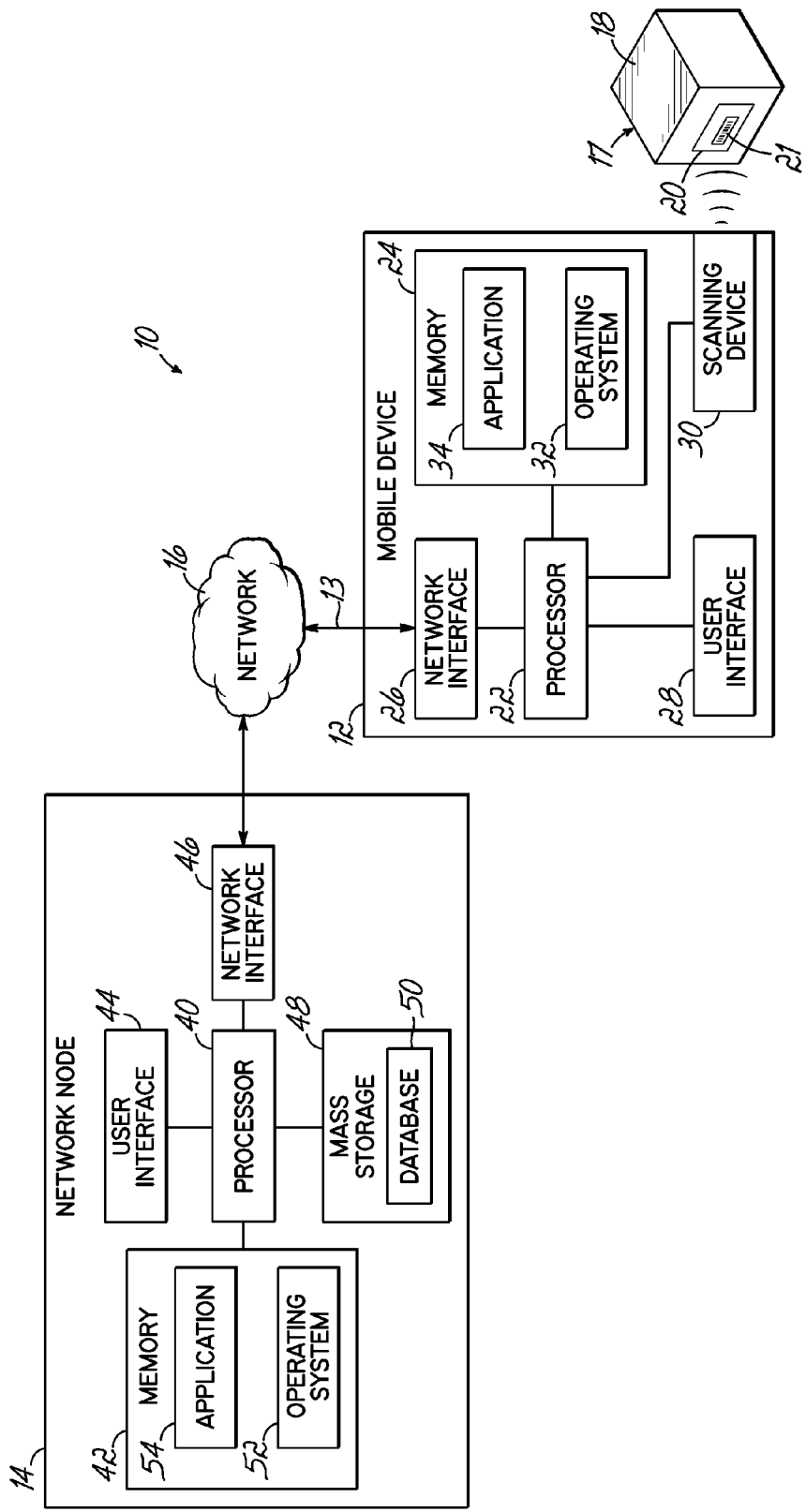
FIG. 1 is a schematic block diagram illustrating a mobile device scanning an exemplary receive label affixed to a package, and a network node in communication with the mobile device via a network.

Embodiments of the present invention are directed to methods and systems for providing instructions for handling packages that require special handling by the package recipient. The package may comprise a shipping container, one or more articles contained within the shipping container, and a label including a machine readable code that can be read by a smart phone, tablet computer, or other suitable reading device. The machine readable code may include data uniquely identifying the package, and data that identifies a link to a network node, such as a database. The reading device may include a mobile application that transmits a query to the database in response to scanning the machine readable code. The database may store data relating to the package that is provided to the reading device in response to the query. This data may include package handling instructions, such as how to unpack the package, how to distribute articles in the package, and how to store the articles once they are unpacked. The handling instructions may be associated with the unique identifier in the database so that the provided instructions can be specific to the particular package scanned.

In response to scanning the machine readable code, the reading device may use the link identified by data extracted from the machine readable code to communicate with the database and download the handling instructions. This communication may also provide a proof of delivery function by notifying the database that the package has been received. By storing the unpacking instructions in the database rather than, or alternatively, in addition to including the instructions with the package, the instructions may be updated at any time, including after the package has shipped. Thus, the instructions may be kept more current than would be possible for instructions provided on a sheet shipped with the package. In addition, because instructions are provided in response to scanning the machine readable code, a package recipient may be automatically and immediately alerted to any special handling requirements at the time the package is received.

The mobile application loaded on the reading device may allow package labels to be scanned by a recipient wherever the package is found and without specialized equipment. To this end, the link identifying data may include a Uniform Resource Identifier (URI), such as a Uniform Resource Locator (URL), Uniform Resource Name (URN), or web address that links the reading device to the unpacking instructions via the Internet. The link may also be a link unique to the package, so that the link both identifies a communication path and provides the unique identifier. However, embodiments of the invention are not limited to mobile reading devices, such as smart phones or tablet computers, that communicate with the database over the Internet. Indeed, a person having ordinary skill in the art would understand that alternative embodiments of the present invention may have the application implemented on any type of suitable reading device, such as a desktop computer in a shipping and receiving area. Moreover, this person of ordinary skill would further understand that the link may include any suitable electronic address that provides a location of an electronic file in a computer filing system or data network.

The method and system of the present invention may also be applied in the distribution of temperature sensitive laboratory reagents. Examples of these reagents may include enzymes shipped in a frozen condition maintained by ice packs or dry ice, or cell culture media shipped in a refrigerated condition. Such reagents are often stocked in freezers or refrigerators in a university or other research laboratory, withdrawn for particular experiments, and periodically restocked. Various systems may be used to track the amounts of various reagents withdrawn by particular scientists or technicians. The withdrawn amounts may be charged to a corresponding account, and the reagents periodically restocked by a distributor or manufacturer of the respective enzyme and/or cell culture media. In some instances, because of consignment arrangements, invoicing to a customer institution may be associated with individual withdrawals from the freezer or refrigerator rather than with the restocking order and shipment.

To facilitate this invoicing and restocking, one or more machine readable codes may be placed on the exterior of the shipping container. When read on receipt, these codes may direct a mobile device at the receiving location to a database which may contain: (1) a list of the products in the shipment, and/or (2) instructions for putting the contents of the shipment into a particular freezer or a particular refrigerator, or instructions for putting some of the contents into one freezer or refrigerator and for putting other parts of the contents into a different freezer or refrigerator.

Referring now to FIG. 1, a system 10 for providing special handling of packages in accordance with an embodiment of the present invention includes a reading device, such as mobile device 12, and a network node 14 in communication with the mobile device 12 via a network 16. The system 10 may be part of a Global Project Management (GPM) system that manages a plurality of activities that are needed to run one or more projects, such as a clinical trial. Thus, and by way of example, the system 10 may include hardware and/or software modules (not shown) configured to invoice a client for services performed in connection with a clinical trial. One such service may be delivery of clinical trial materials to a clinical investigation facility. The scope of services that may be provided by the system 10 may further include inventory and product management modules, such as packaging of trial drug samples, comparators, and/or placebos into bottles or blister packs for use in a clinical trial. This packaging may occur before any allocation of particular inventory to particular clinical investigators has been made.

In an embodiment of the present invention, the system 10 is configured to provide handling instructions to a recipient of a package 17. The package 17 may include a shipping container 18 that contains one or more articles requiring special handling, and a receiving label 20 that includes one or more machine readable codes 21. The mobile device 12 may be a smart phone, a tablet computer, or any other device suitable for scanning the machine readable code 21 and communicating with the network node 14 and/or other system resources over the network 16. The network 16 may include one or more local access networks (LANs), wireless networks (private or commercial), and/or publically accessible networks, such as the Internet, that communicatively couples the mobile device 12 to the network node 14.

The mobile device 12 may be coupled to the network 16 using any suitable communication link 13, such as a wireless communication link. To this end, the network 16 may include a wireless access point (not shown) that provides a wireless interface, such as an IEEE 802.11 air interface (commonly known as Wi-Fi) that operatively couples the mobile device 12 to the network 16. The network 16 may thereby allow the mobile device 12 to establish the communication link 13 as needed to communicate with the network node 14 and/or any other computer resources connected to the network 16 without requiring the mobile device 12 be physically tethered to the network 16. The communication link 13 may also be provided by a wireless carrier that provides network access through a suitable commercial air interface, such as WiMax, GPRS, EDGE, 1×RTT, EV-DO, and/or UMTS. In any case, persons having ordinary skill in the art of computer networks will understand that any suitable wireless or wire-line protocol may be employed to provide communication between the mobile device 12 and the network 16, and the present invention is not limited to a specific type of mobile device 12, communication link 13, or network 16. Persons having ordinary skill in the art will further understand that embodiments of the present invention also include devices that provide the functions of the mobile device 12, but that are physically tethered to the network. For example, a desktop computer having a wired network connection may be used to scan the receiving label 20 of shipping container 18 as packages are received in a shipping and receiving department.

The mobile device 12 includes a processor 22, a memory 24, a network interface 26, a user interface 28, and a scanning device 30. The processor 22 may include one or more processors selected from microprocessors, micro-controllers, digital signal processors, microcomputers, central processing units, field programmable gate arrays, programmable logic devices, state machines, logic circuits, and/or any other devices that manipulate signals (analog and/or digital) based on operational instructions that are stored in memory 24. Memory 24 is operatively coupled to the processor 22, and may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing data.

Processor 22 may operate under the control of an operating system 32 that resides in memory 24. When present, the operating system 32 manages the mobile device resources so that program code embodied as one or more applications 34 residing in memory 24 may have instructions executed by the processor 22. In an alternative embodiment, the application 34 may be executed by the processor 22 directly, in which case the operating system 32 may be omitted. The network interface 26 of mobile device 12 may include suitable radio transceiver circuitry. The network interface 26 may thereby be configured to support the wireless communication link 13 between the mobile device 12 and the network 16.

The user interface 28 is operatively coupled to the processor 22 of mobile device 12, and includes at least one output device and one input device. Suitable output devices for the mobile device 12 include, but are not limited to, a touch screen, an alphanumeric display, an audio transducer, and/or any other visual, audible, and/or tactile indicator. Likewise, suitable input and/or control devices include, but are not limited to, the aforementioned touch screen, an alphanumeric keyboard or keypad, a pointing device, push-buttons, a microphone, and/or any other device capable of accepting commands or input from the user and transmitting the entered input to the processor 22. The user interface 28 thereby provides a mechanism whereby a user may input data to, and receive data from, the processor 22.

The scanning device 30 is configured to scan the machine readable code 21, the most common forms of which are referred to as a barcode (in the case of a 1-dimensional code) or a Quick Response (QR) code (in the case of a 2-dimensional code). Although the embodiments of the present invention described herein are generally described as using printed barcodes and/or QR codes, it should be understood that embodiments of the present invention may also be used with other devices configured to store data, such as a Radio Frequency Identity (RFID) tag attached to or placed in the container 18. The term "machine readable code" should therefore not be considered as limiting the present invention to barcodes and/or QR codes as a method of storing data on the receiving label 20. Rather, the term "machine readable code" as used herein is intended to encompass all forms of data storage devices that can be read by scanning a label or device included in or on the shipping container 18.

To obtain data from the machine readable code 21, the scanning device 30 may include a light source, such as a laser, that illuminates the machine readable code 21, and a photo detector that generates an electrical signal in response to light reflected from the code 21. The scanning device 30 may, in addition to or instead of the light source and photo detector, include an image capturing device (e.g., a digital camera) that captures images representative of the surrounding environment. These captured images may be processed into any suitable digital image file format known in the art, such as a raw image file, bit map, or Joint Photographic Experts Group (JPEG) formatted image (to name but a few) by the processor 22 and stored in memory 24. A digital image processing technique may then be used by the mobile application 34 to decode any machine readable code 21 that appears in the captured image. In embodiments of the present invention including an RFID tag, the scanning device 30 may also include a radio transceiver (not shown) configured to transmit RF signals that activate the RFID tag, and receive RF signals from the RFID tag that are transmitted in response to said activation.

Similarly as described with respect to the mobile device 12, the network node 14 may include one or more processors 40, a memory 42, a user interface 44, and a network interface 46. The network interface 46 provides a communication link between the processors 40 and the network 16 using a suitable network communication protocol, such as Transmission Control Protocol/Internet Protocol (TCP/IP) over Ethernet.

The user interface 44 includes one or more suitable output devices, such as a color monitor or other visual display, one or more speakers, one or more formatted electronic media writers, such as a flash memory card, memory stick, USB-stick, CD, magnetic disk, and/or any other suitable output devices capable of storing data or conveying data to the system user. The user interface 44 may also include suitable input devices such as an alphanumeric keyboard, a pointing device or mouse, a touch pad, a microphone, one or more readers of the aforementioned formatted electronic media, or any other input devices capable of accepting commands or input from the user and transmitting the entered input to the processor 40.

The network node 14 may also include mass storage device 48. The mass storage device 48 may comprise a single mass storage device or a plurality of mass storage devices including but not limited to hard drives, optical drives, tape drives, non-volatile solid state devices and/or any other device capable of storing digital data. A database 50 residing in memory 42 or the mass storage device 48 (shown) may include data relating to packages 17 so as to provide a searchable database that receives data from, and provides data to, one or more system applications, such as the mobile application 34. Although shown as a single database 50, database 50 may include multiple databases configured to support various system functions. Moreover, although depicted as a single database residing in a single network node, a person having ordinary skill in the art would understand that the database 50 and/or the network node 14 may represent one or more hardware platforms each hosting one or more applications and/or databases. The network node 14, database 50, and any applications residing therein may also be provided as a service over the network 16 as part of a cloud computing system.

The network node processor 40 typically operates under the control of an operating system 52 that resides in memory 42 and executes program code embodied as one or more applications 54 residing in memory 42. The one or more applications 54 may include a plurality of program modules and/or programs that support various system functions. These applications 54 may access the database 50 to provide data to, and store data from, the mobile application 34 in response to requests received over the network 16. One or more of these applications 54 may also be copied from the network node 14 to another memory, such as the memory 24 of mobile device 12, as needed to perform functions related to the operation of the system 10.

Although illustrated as being deployed in a single hardware platform in FIG. 1 for simplicity's sake, it should be understood that the network node 14 may represent a plurality of network nodes, hardware platforms, software programs, and/or modules that comprise the system 10. Moreover, various program code described herein may be identified based upon the application or software component within which it is implemented in a specific embodiment of the present invention. However, it should be appreciated that any particular program nomenclature used herein is merely for convenience, and thus the present invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the present invention is not limited to the specific organization and allocation of program functionality described herein.

Thus, persons skilled in the art will recognize that the exemplary operational environment illustrated in FIG. 1 is not intended to limit the present invention. Embodiments of the present invention may therefore include alternative hardware and/or software environments, and incorporate different numbers and configurations of hardware and software resources without departing from the scope of the present invention.

Figure 2:
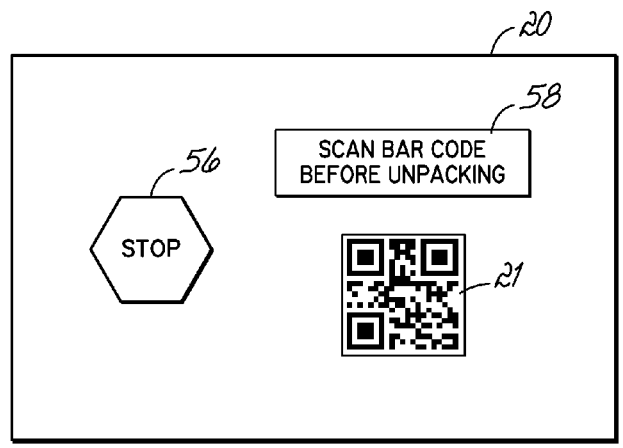
FIG. 2 is a diagrammatic view of the exemplary receive label of FIG. 1 illustrating a machine readable code included on the label.

Referring now to FIG. 2, and in accordance with an embodiment of the present invention, the receiving label 20 is illustrated in more detail. The receiving label 20 may include an indicia 56 configured to capture the attention of a package recipient (such as the illustrated stop sign symbol), written instructions 58 informing the recipient to perform some task before unpacking (such as scanning the receiving label 20), and the machine readable code 21, which is depicted as a QR code. The instructions 58 may also inform the recipient of the need to download the mobile application 34, and how the mobile application 34 may be obtained (e.g., by visiting a web site). Optionally, the receiving label 20 may also include additional data and/or machine readable codes (not shown), that provide additional information. This additional information may include, for example, possible hazards associated with the contents of the shipping container 18, required safety codes, U.S. Department of Transportation (DOT) shipping information, or any other package data.

The machine readable code 21 may include a unique identifier that uniquely identifies the package 17, and data identifying a link that can be used to obtain data relating to the package 17. The unique identifier may include, for example, a shipment number and authentication code. The authentication code may be configured so that simply providing a valid shipment number will not be sufficient to retrieve package data from the database 50. To this end, the authentication code may include encoded data that is known only to the database 50 and/or network node application 54. The authentication code may thereby be used to confirm that a received request for information on a package 17 is legitimate. This type of confirmation may be used, for example, to protect sensitive information relating to clinical trial supplies, samples, test subjects, clients, results, or any other sensitive data. An example of an authentication code would include a code comprising a shipment ID number and an authentication date. In an embodiment of the present invention, the unique identifier may be a 128-bit number that would be difficult to guess. This 128-bit unique identifier may be a globally unique identifier, and may be generated in a number of ways known in the art. For example, the 128-bit number may be defined by a combination of unique settings or parameters of a network node (e.g., an IP address, network MAC address, clock date/time, and/or random number) related to a specific point in time.

Figure 3:
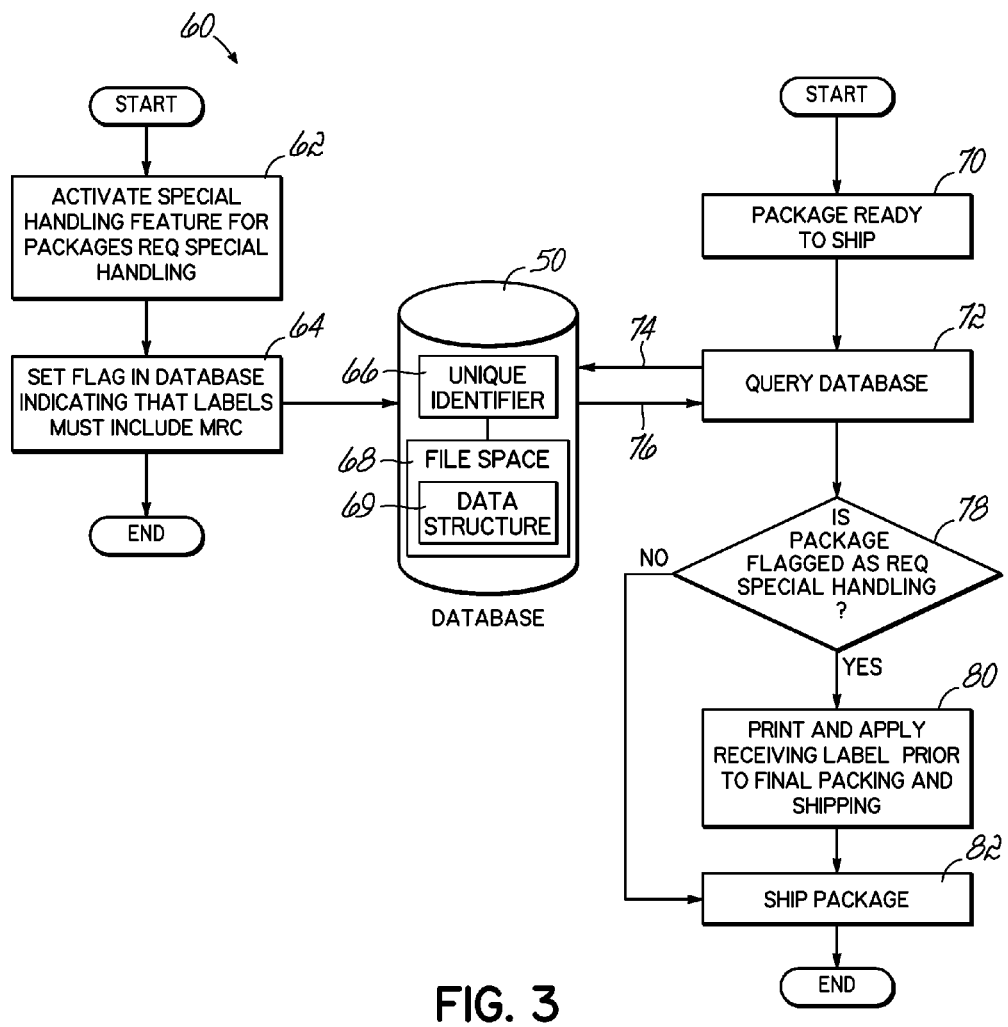
FIG. 3 is a flow chart illustrating a process for configuring a database to maintain a file space associated with a unique identifier embedded in the machine readable code of FIG. 2, and for generating the exemplary receive label.

Referring now to FIG. 3, a flow chart 60 illustrates a process by which the system 10 may: (1) associate a unique identifier with the package 17, and (2) generate the receiving label 20. In block 62, a special handling feature may be activated in the system 10. In response to activation of the special handling feature, the database 50 may generate a scan configuration table that includes an identity number, name, description, dollar value, and an active/inactive flag bit associated with the package and/or study requiring special handling. The feature activation may be for a single package 17 that requires special handling, or may be for a plurality of packages 17 that are involved in a clinical study. For example, the feature may be activated for all packages 17 containing samples being administered to test subjects as part of a clinical study for a pharmaceutical product. Activation of this special handling feature may cause the system 10 to require receiving labels 20 be printed and affixed to all packages 17 identified as being subject to this feature. For example, activation of the feature at a study level may require that all packages 17 related to a particular clinical study be provided with the receive label 20. Activation of the special handling feature may also cause the database 50 to associate scanning of a label 20 with an order for a product, associate the order with a protocol for administering the product, and/or associate the protocol with a client.

In block 64, a flag may be set in the database 50 indicating that an identified package 17 requires special handling (e.g., is part of the clinical study). The flag may be set in the scan configuration table, and may be set at a study level (i.e., any package involved in the study is flagged) or at a package level (i.e., only that package is flagged). In response to setting the flag, the database 50 may assign a unique identifier 66 to the package 17. The database 50 may also associate a file space 68 in the database 50 with the package 17 based on the unique identifier 66. This file space 68 may be populated with one or more data structures 69 that include data relating to the package 17. This data may include, for example, data specific to the particular package such as detailed unpacking instructions, a current status of the package, and/or a shipping history of the package.

Data in the file space 68 may be accessed by various system applications, such as the mobile and node applications 34, 54, to store and retrieve data specific to the package 17 identified by the unique identifier 66. Additional data stored in the database 50 may include, but is not limited to: a receiving charge (which may be stored at a default level, and may be subject to study and client overrides), a transaction record with data indicative of what packages 17 have been scanned for a particular study, the aforementioned detailed unpacking instructions, and flags at the study and/or package level that activate generation of the receiving label 20 and billing for the package 17.

In block 70, the package 17 is packed with articles and made ready to ship. The articles may include, for example, pharmaceutical samples that are to be administered to a test subject as part of a clinical study. In block 72, a query 74 is transmitted to the database 50 requesting shipping data relating to the package 17. The query 74 may be transmitted, for example, by a shipping management application (not shown) that is part of the system 10. In response to the query 74, the database 50 may determine that the package 17 is flagged for special handling. Based on this determination, the database 50 may transmit a response 76 that includes the unique identifier 66 and data identifying a link to the file space 68. In response to receiving the response 76, the shipping management application may proceed to block 78.

In block 78, the shipping management application may determine if the package 17 is flagged as being related to the clinical study or as otherwise requiring special handling. This determination may be based on data included in the response 76. If the package 17 is flagged ("Yes" branch of decision block 78), the shipping management application may proceed to block 80 and cause the receiving label 20 to be printed and affixed to the package 17 prior to shipment. The shipping management application may also prompt the shipper to scan the receive label 20 to verify that the label 20 is configured properly and recognized by the system 10. This scanning operation may also generate a data point in the database 50 that verifies the package 17 was shipped at a certain point in time. The receiving label 20 may include the machine readable code 21, which in turn includes data corresponding to the unique identifier 66, and data identifying a link to the file space 68. The package 17 may thereby be associated with the file space 68 in the database 50 by the label 20. The system 10 may be further configured so that the receiving label 20 may be reprinted if, for example, the receiving label 20 becomes damaged.

If the package 17 is not flagged in the database ("No" branch of decision block 78), the shipping management application may omit printing of the receiving label 20. In any case, in block 82, the package 17 is shipped to the recipient.

Figure 5:
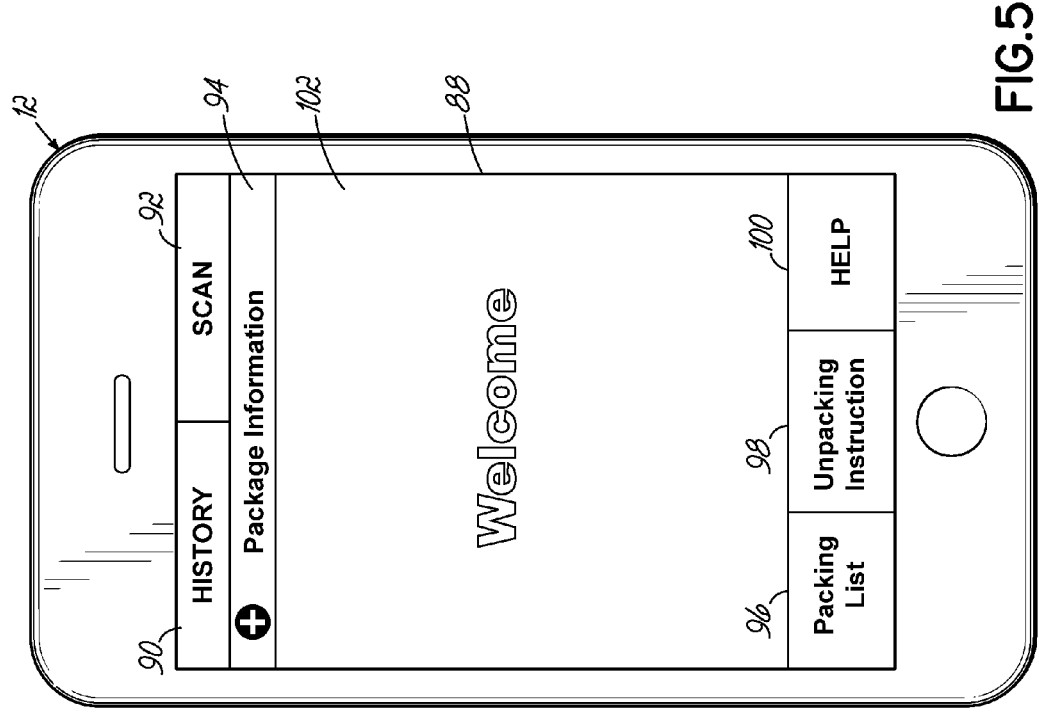
FIG. 5 is a diagrammatic view of an exemplary screen shot of the mobile device of FIG. 1 showing a welcome screen displayed by the mobile application.
Figure 4:
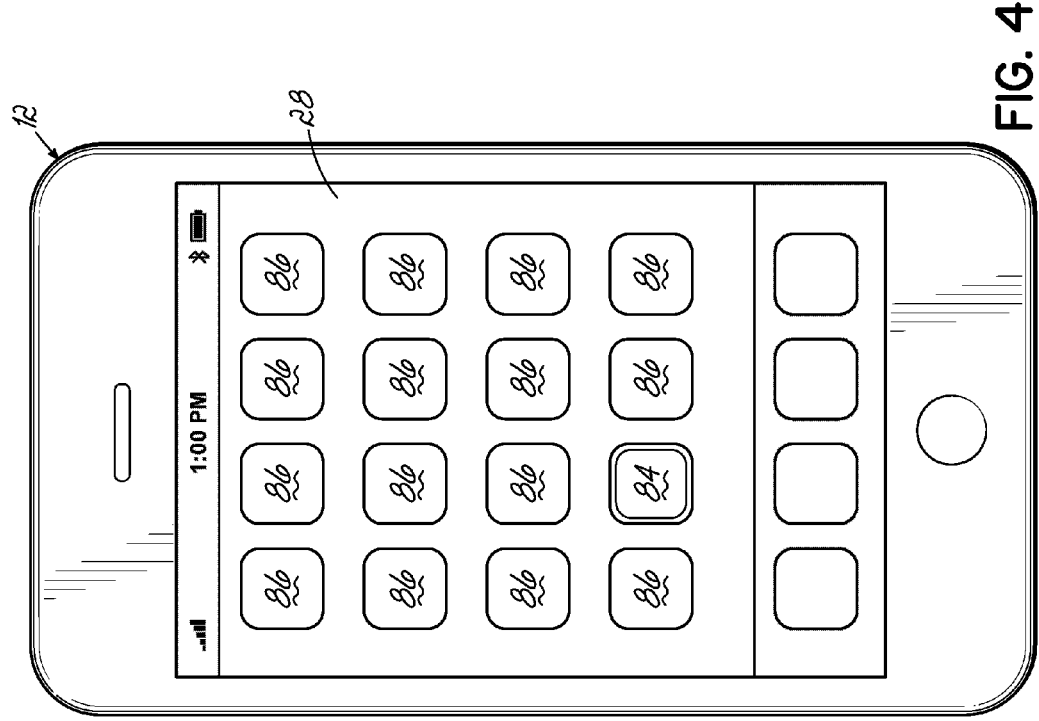
FIG. 4 is a diagrammatic view of an exemplary screen shot of the mobile device of FIG. 1 showing an icon for activating a mobile application.

Referring now to FIGS. 4 and 5, an exemplary mobile device 12 is illustrated as a smart phone on which the mobile application 34 has been installed. The mobile application 34 may be installed, for example, by downloading the application 34 from a network node, such as a web server. Once installed on the mobile device 12, the mobile application 34 may be accessed via a mobile application icon 84, which may be displayed on the user interface 28 (e.g., a touch screen) of mobile device 12 along with additional icons 86 that provide access to other applications on the mobile device 12.

In response to activation of the mobile application icon 84, the mobile application 34 may display a start-up screen 88 that includes a scan history button 90, a scan button 92, a package information button 94, a packing list button 96, an unpacking instructions button 98, a help button 100, and a data display window 102. In the illustrated embodiment, the buttons 90, 92, 94, 96, 98, 100 may comprise a main menu that is displayed on all screens presented by the application 34. The main menu may thereby enable the mobile device user to toggle between information quickly regardless of their location in the application 34. The data displayed in the data display window 102 may depend on which button 90, 92, 94, 96, 98, 100 is activated. In an embodiment of the present invention, the mobile application 34 may start up in a scan mode. In the scan mode, the data display window 102 may display images that are currently being captured by a built-in camera of the mobile device 12 to facilitate aiming the mobile device 12 at the receiving label 20.

Figure 6:
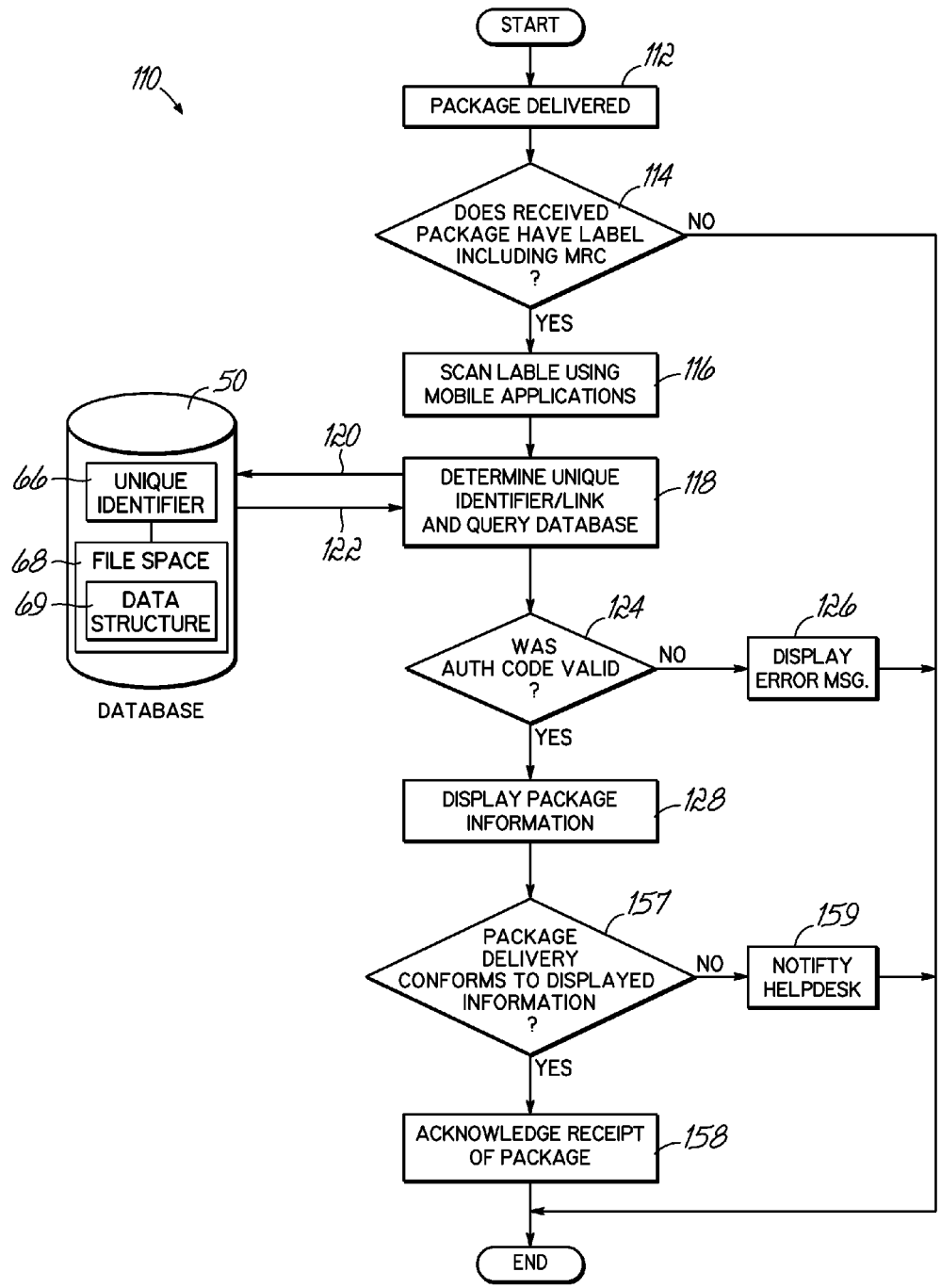
FIG. 6 is a flow chart illustrating an exemplary process for receiving the package in FIG. 1, and for retrieving the data from the database of FIG. 3 based on the unique identifier.

Referring now to FIG. 6, a flow chart 110 is presented that illustrates a process by which the package 17 may be received at a clinical investigation facility. In block 112 the package 17 is delivered to the clinical investigation facility. The package 17 may be delivered as part of a shipment for a clinical study, or as part of a routine daily drop-off by a shipping company or the U.S. Postal Service. In block 114, a system user receiving the package 17 may determine if the package 17 includes a receiving label 20 having the machine readable code 21. If the package 17 does not have the receiving label 20 ("No" branch of decision block 114), the package 17 may be received using the clinical investigation facility's conventional package receiving process. If the package 17 does include the receiving label 20 ("Yes" branch of decision block 114), the process may proceed to block 116.

Figure 7:
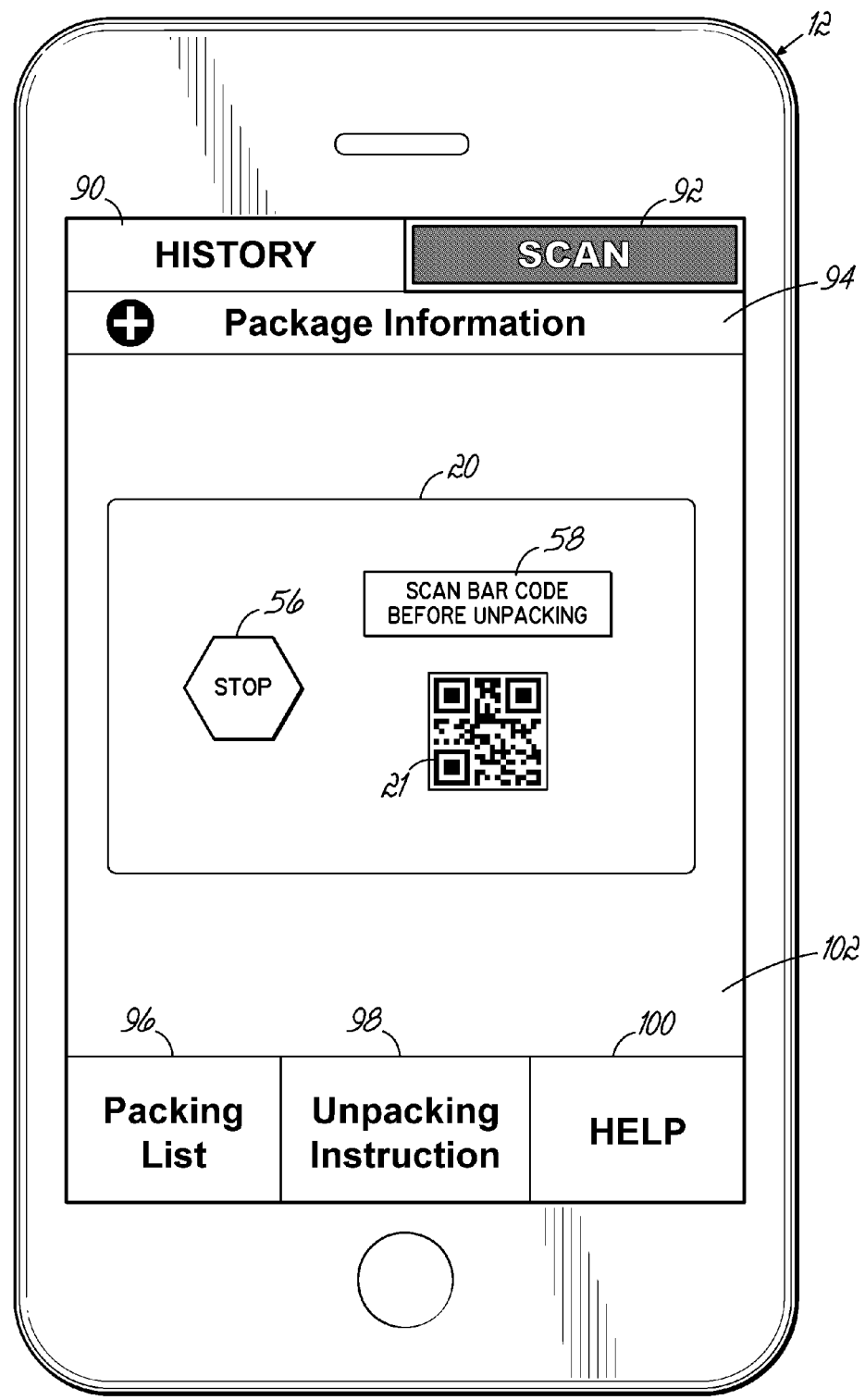
FIG. 7 is a diagrammatic view of an exemplary screen shot of the mobile device of FIG. 1 showing a scanning screen displayed by the mobile application.

Referring now to FIG. 7 and with continued reference to FIG. 6, in block 116, the user may begin the process of scanning the receiving label 20 by activating the mobile application icon 84, or if the application 34 is already running, the scan button 92. In response to activation of the mobile application icon 84 or scan button 92, the mobile application 34 may open a screen in the data window 102 that enables the user to scan the machine readable code 21. The mobile application 34 may use the built-in camera of the mobile device 12 as the scanning device 30 to "scan" the machine readable code 21. As depicted in FIG. 7, to assist the recipient in capturing an image of the receiving label 20, the mobile application 34 may display images currently being captured by the built-in camera in the data display window 102. The display may also include on-screen instructions instructing the user to point the camera at the machine readable code 21 and take a picture. In response to the recipient providing an indication that the machine readable code 21 is suitably framed in the camera (e.g., by tapping the data display window 102 or scan button 92), the mobile application 34 may capture the displayed image 102. The mobile application 34 may then identify the machine readable code 21 in the captured image and extract the data contained therein.

In response to scanning the receiving label 20, the process may proceed to block 118. In block 118, the mobile application 34 determines the unique identifier 66 and the data identifying the link to the file space 68 based on data extracted from the machine readable code 21. The mobile application 34 may then transmit a query 120 including the unique identifier 66 to the database 50. This query may be transmitted over the link identified by the link identifying data extracted from the machine readable code 21. In an embodiment of the present invention, the mobile application 34 may be configured to direct all communication with the system 10 through the database 50. The database 50 may thereby prevent a person who has hacked the mobile application 34 from having direct access to the entire system 10.

In response to receiving the query 120, the database 50 may determine if the unique identifier includes a valid authorization code. If the authorization code is valid, the database 50 may proceed to identify the file space 68 associated with the package 17 and transmit a response 122 to the mobile device 12. In an alternative embodiment, the response 122 may be transmitted to some other suitable data receiving device, such a desktop computer. In other words, it is contemplated that the data receiving device may comprise the mobile scanning device, or alternatively, the data receiving device may comprise a computing device independent of the scanning device. The response 122 may include information relating to the package 17, which may be stored as one or more data structures 69 in the file space 68. This data may include, for example, clinical protocol data, a shipment number, a control/client order number, a shipment address, packing list information (e.g., a description and quantity of each item in the package 17, as well as lot and part numbers, if applicable), storage requirements, and detailed unpacking instructions.

The database 50 may also record the use of the mobile application 34 to scan the receive label 20. The database 50 may thereby build a record that can be used to track metrics relating to use of the mobile application 34. Data stored in this mobile application record may include data relating to the use of the application 34 for a specific shipment or package 17, the date and time the label 20 was scanned, a location of the mobile device 12 at the time of the scan, as well as IP Addresses and MAC addresses of the mobile device 12 and any intervening network nodes.

If the authorization code is not valid, the database 50 may transmit a response 122 to the mobile application 34 indicating that an error has occurred. The database 50 may also record the occurrence of the error in an error table. This error table may be maintained separately from a table of successful scans to facilitate tracking of errors. The error table may, for example, be used to provide an alerting feature that alerts a support team when an error occurs more than predetermined number of times, which could indicate an attempt to access clinical trial data by an unauthorized party.

In an alternative embodiment of the invention, the mobile application 34 may be configured to determine if the machine readable code 21 contains valid data based on an internal analysis prior to sending the request 120. This alternative embodiment may thereby reduce traffic between the mobile device 12 and database 50. In any case, in response to receiving the response 122, the mobile application 34 may proceed to block 124.

Figure 8:
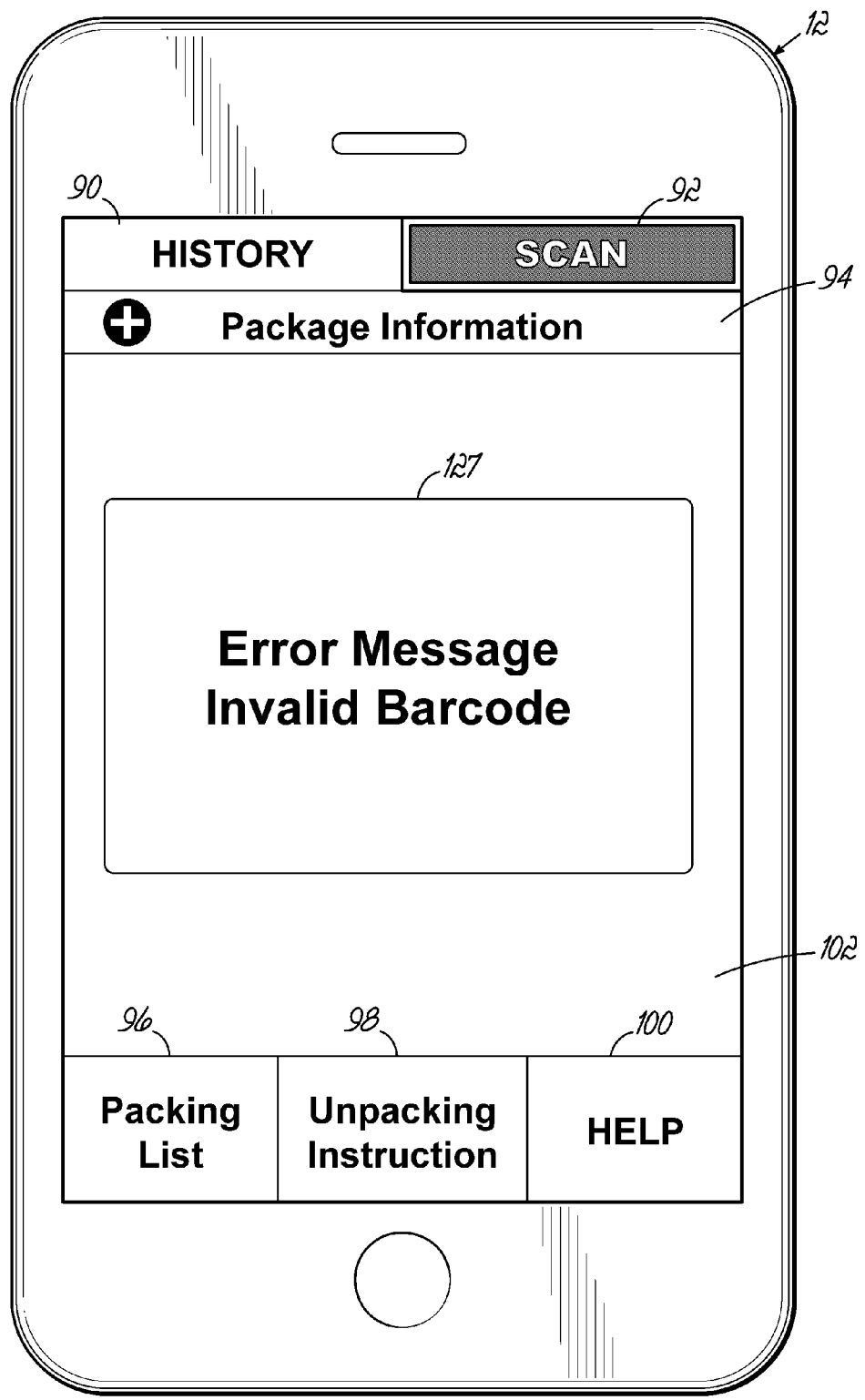
FIG. 8 is a diagrammatic view of an exemplary screen shot of the mobile device of FIG. 1 showing an error message displayed by the mobile application.

Referring now to FIG. 8, and with continued reference to FIG. 6, in block 124, the mobile application 34 may determine if the authentication code is valid based on either the response 122 received from the database 50, or on the internal analysis of the data received from the machine code 21. In either case, if the authorization code is not valid ("No" branch of decision block 124), the process 110 may proceed to block 126. In block 126, the mobile application 34 may display an error message 127 indicating that the machine readable code 21 contained invalid data. Invalid data may include, for example, an authorization code that does not match the authorization code in the database 50. The mobile application 34 may also display an error message if the mobile application has not yet been enabled for the clinical study (e.g., the clinical study has not been activated in the system), if the mobile application 34 is unable to establish contact with the database 50, or for any other suitable reason. By requiring that the authentication code transmitted to the database 50 match the authentication code in the database 50, the system 10 may make it difficult for a user to access study or package data in the database 50 unless they have the package 17 in their possession.

Referring now to FIGS. 9-13, and with continued reference to FIG. 6, if the authorization code is determined to be valid ("Yes" branch of decision block 124), the process 110 may proceed to block 128. In block 128, the mobile application 34 may display information relating to the package 17. This information may include data residing in the file space 68 that was included in the response 122, data extracted directly from the machine readable code 21, data retrieved from some other location (e.g., a web site), or any other data relating to the package 17 that is accessible by the mobile device 12. As depicted in FIGS. 9-13, this data may be selectively displayed in the data display window 102 as text, images, or in any other suitable form based on which button 90, 94, 96, 98, 100 is activated by the user.

Figure 9:
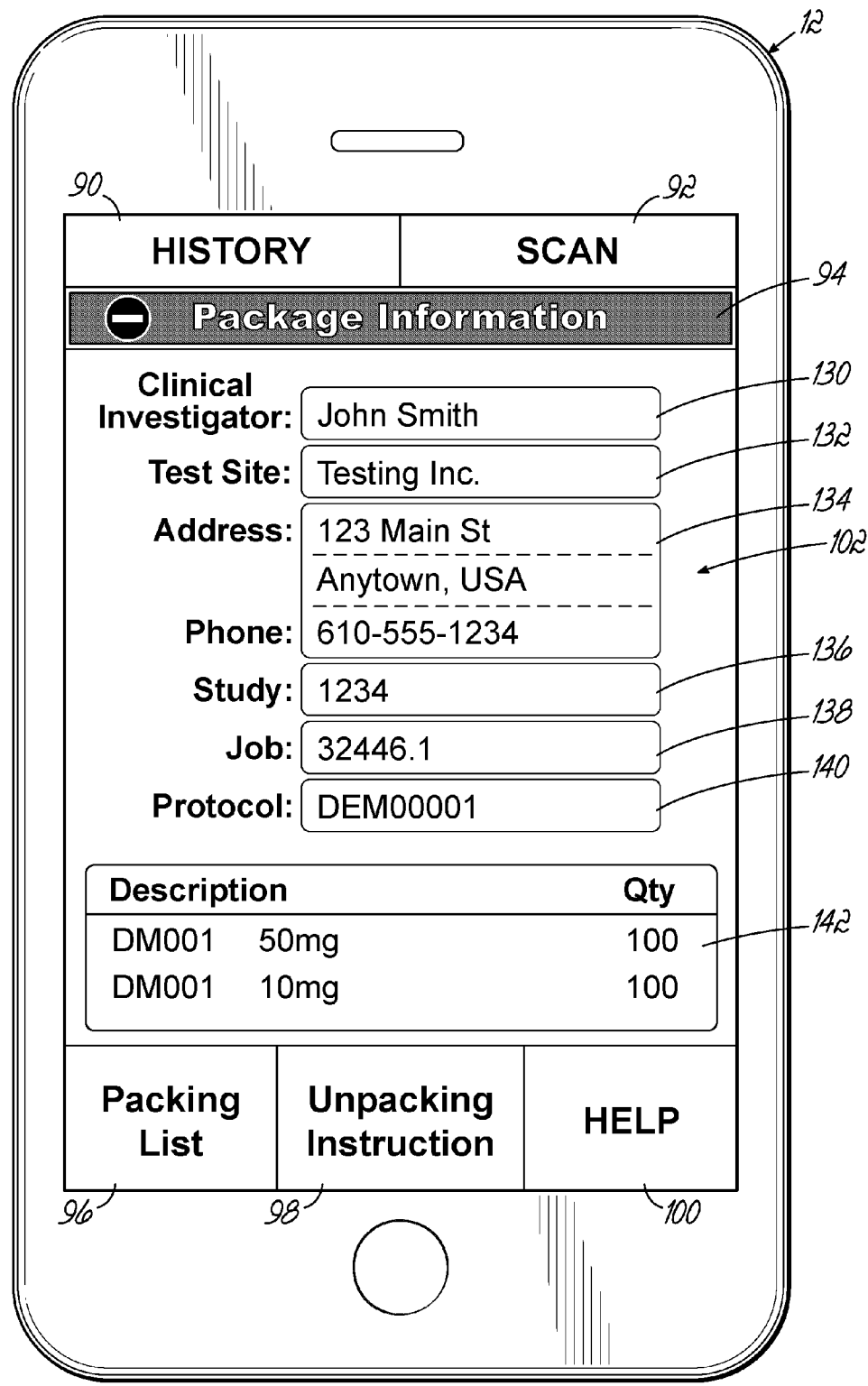
FIG. 9 is a diagrammatic view of an exemplary screen shot of the mobile device of FIG. 1 showing a package information screen displayed by the mobile application.

As depicted in FIG. 9, in response to activation of the package information button 94, the mobile application 34 may display data relating to the package 17. This data may include data relating to a clinical study to which the articles in the package 17 are related. To this end and as shown in the exemplary embodiment, the data may include the name of a clinical investigator 130, an identity of a test site or testing facility 132 that is performing the clinical study, contact information 134 for the clinical investigator 130 and/or testing facility 132, a clinical study number 136, a job number 138, a protocol number 140, and a description 142 of samples included in the package 17. The package information may also include a warning if special storage conditions are required for any of the contents of the package 17. Advantageously, this data may facilitate delivery of the package 17 to the correct person or area based on the clinical investigator, the clinical study, and/or the testing facility. The displayed data may also facilitate placing any articles in the package 17 that require special storage conditions in an appropriate storage location (e.g., a refrigerator) in a timely manner.

Figure 10:
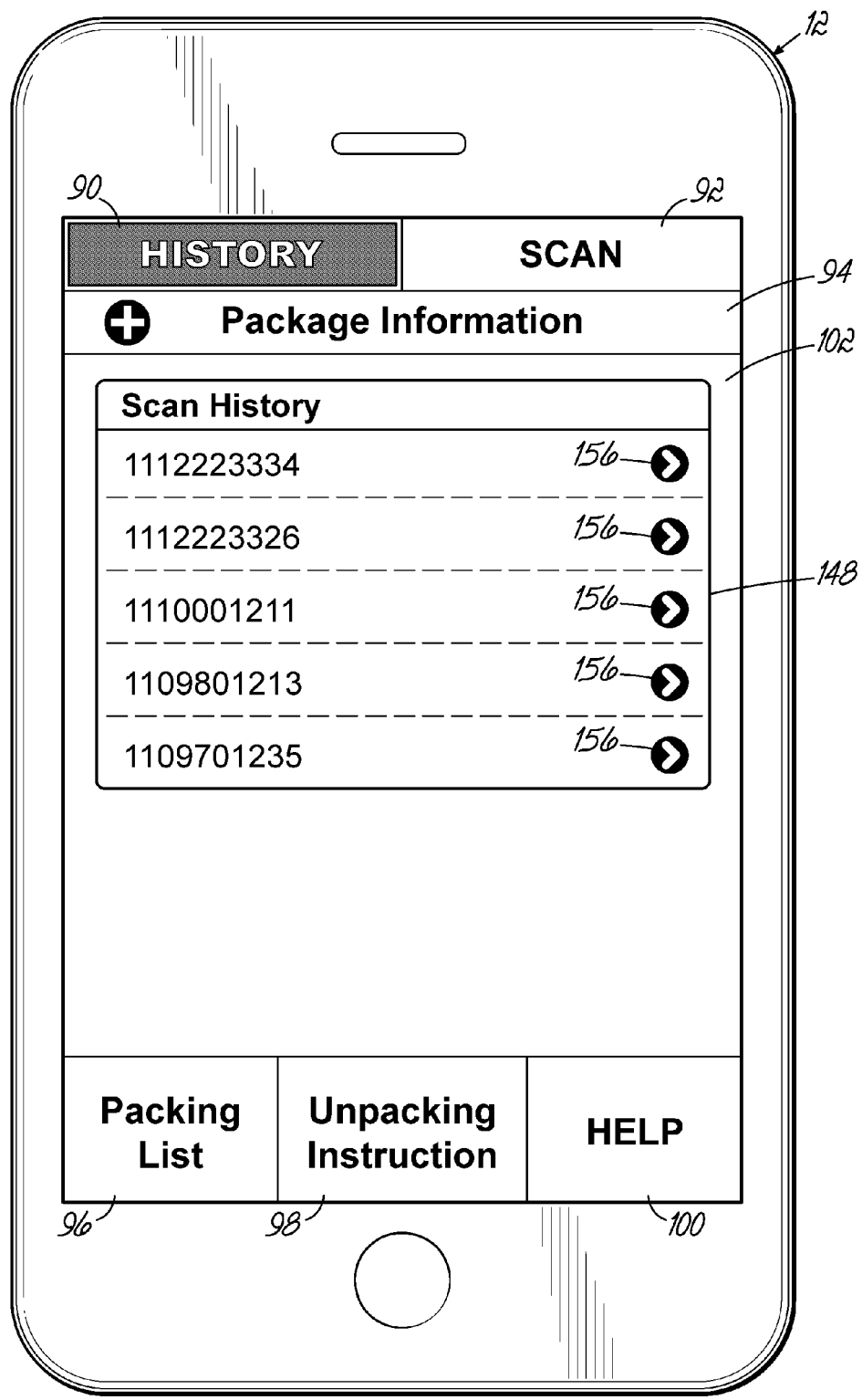
FIG. 10 is a diagrammatic view of an exemplary screen shot of the mobile device of FIG. 1 showing a scan history screen displayed by the mobile application.
Figure 11:
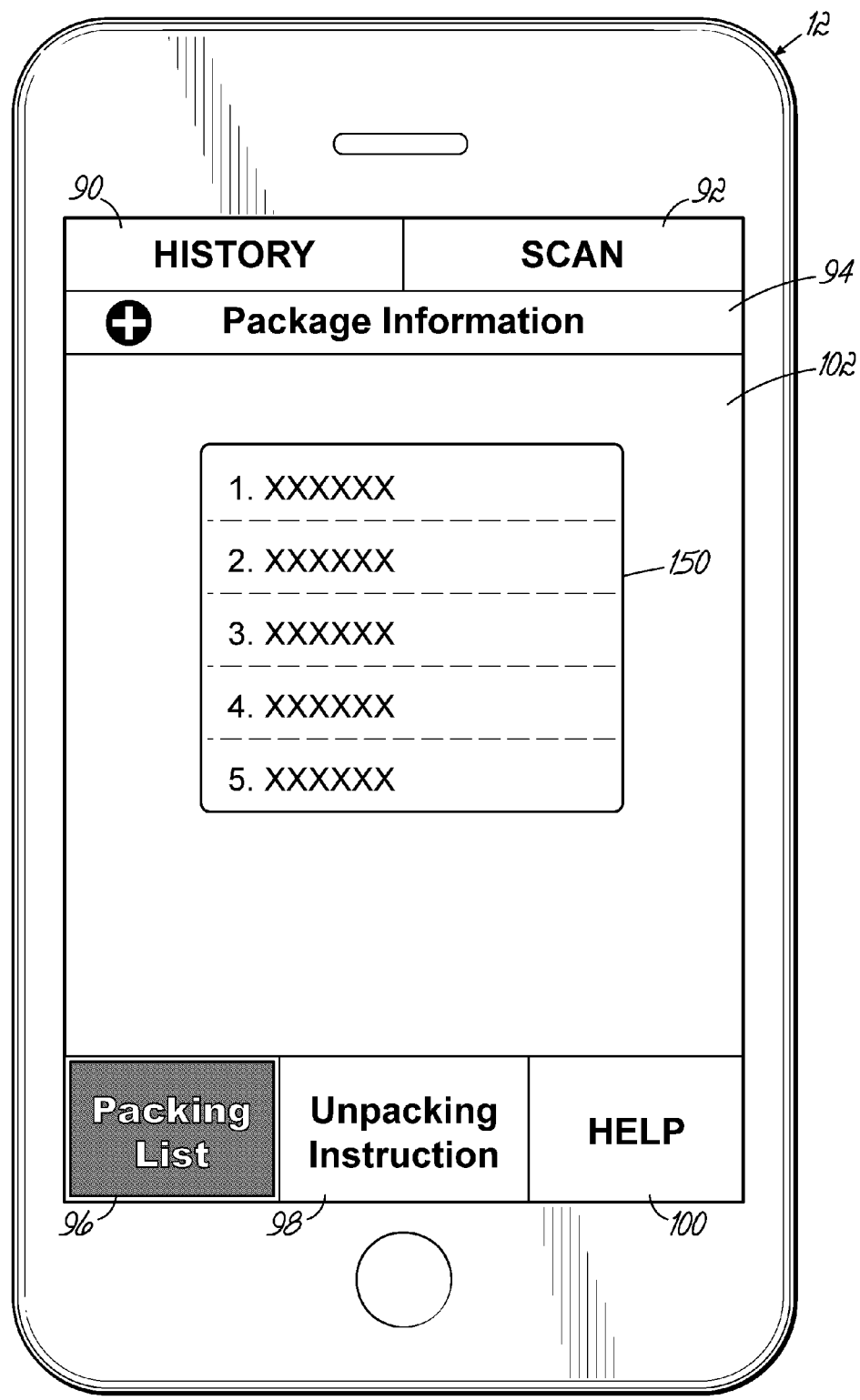
FIG. 11 is a diagrammatic view of an exemplary screen shot of the mobile device of FIG. 1 showing a packing list screen displayed by the mobile application.
Figure 12:
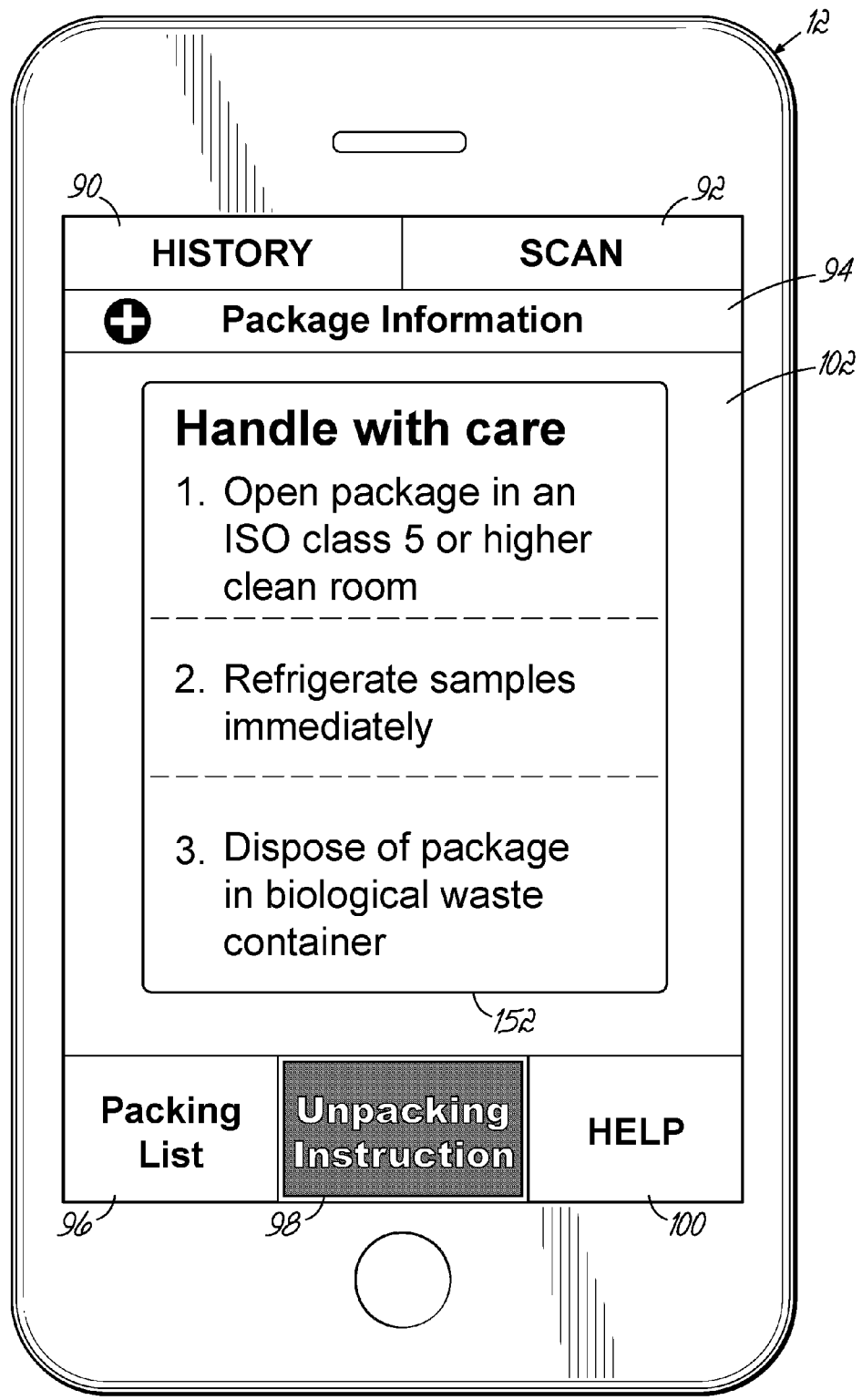
FIG. 12 is a diagrammatic view of an exemplary screen shot of the mobile device of FIG. 1 showing an unpacking instructions screen displayed by the mobile application.
Figure 13:
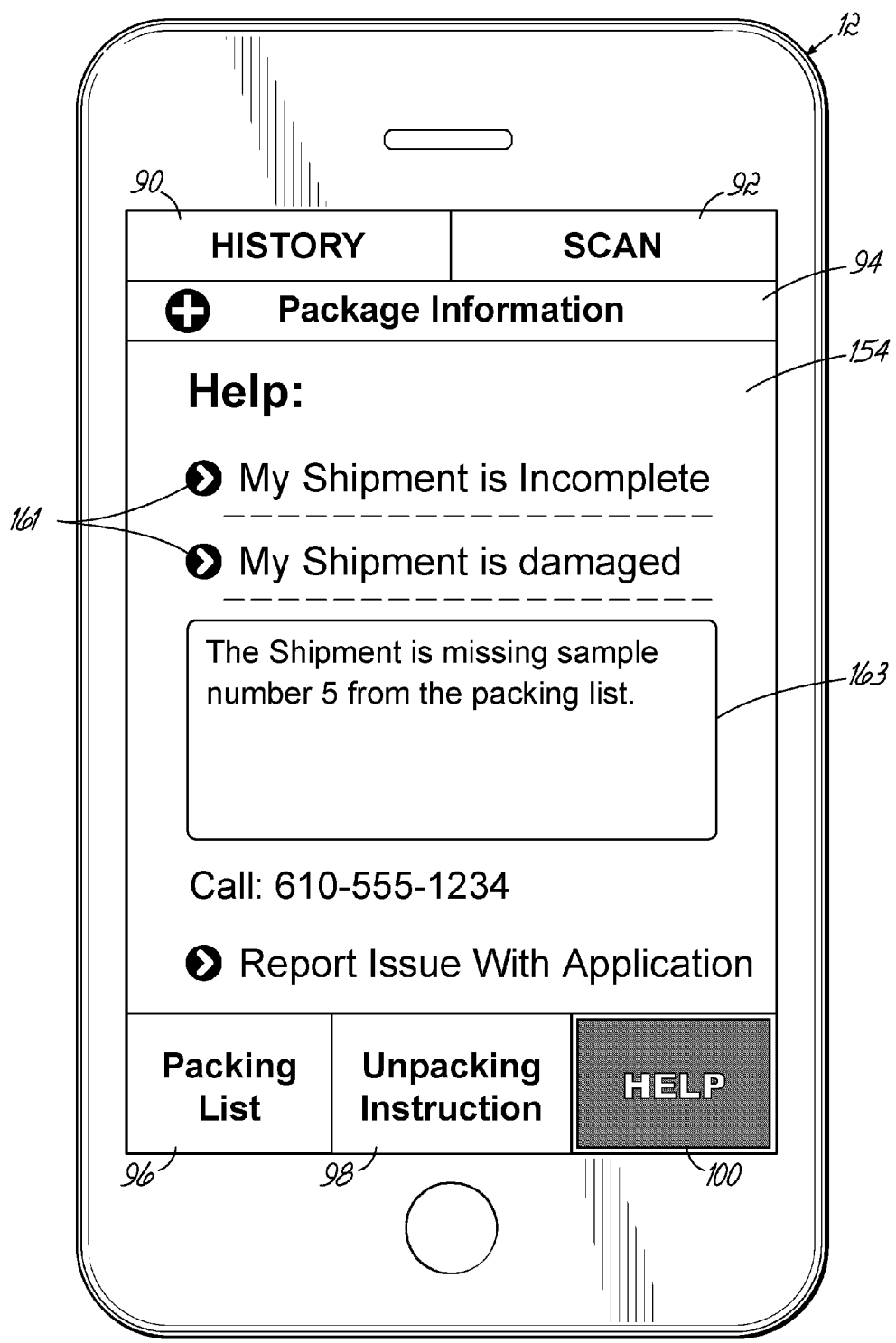
FIG. 13 is a diagrammatic view of an exemplary screen shot of the mobile device of FIG. 1 showing a help screen displayed by the mobile application.

In a similar fashion, in response to activation of other main menu buttons 90, 96, 98, 100, the mobile application 34 may display a list of previously scanned packages 148 (as depicted in FIG. 10), a packing list 150 (as depicted in FIG. 11), unpacking instructions 152 (as depicted in FIG. 12), and a help window 154 (as depicted in FIG. 13). In an embodiment of the present invention, the list of previously scanned packages 148 may include buttons 156 that activate drop down windows (not shown) for displaying data. The user may thereby selectively display data relating to previously scanned packages 17 by activating the button 156 corresponding to the package of interest. The scanning history data may be stored in the database 50, and may be retrieved by the mobile application 34 in response to activation of the scan history or drop-down window buttons 90, 156.

Referring to FIG. 13 with continued reference to FIG. 6, in block 157 the user may determine if the delivered package 17 conforms to the data displayed by the mobile application 34. If the package 17 delivered does conform to the displayed data ("Yes" branch of decision block 157), the user may acknowledge receipt of the package in block 158. This acknowledgement may be recorded in the database 50 to facilitate tracking of and billing for the package 17. If the package 17 delivered does not conform to the displayed data ("No" branch of decision block 157), the user may notify the system helpdesk in block 159 via the help window 154. To this end, the help window 154 may include one or more buttons 161 that provide a drop down window 163 which allows the user to enter data describing a problem with the package 17. The mobile application 34 may thereby enable the user to send a message to a helpdesk describing any issues they may have with the package 17. For example, the user may inform the helpdesk that they are not the correct recipient of the package 17, or that the package 17 is missing a sample.

Figure 14:
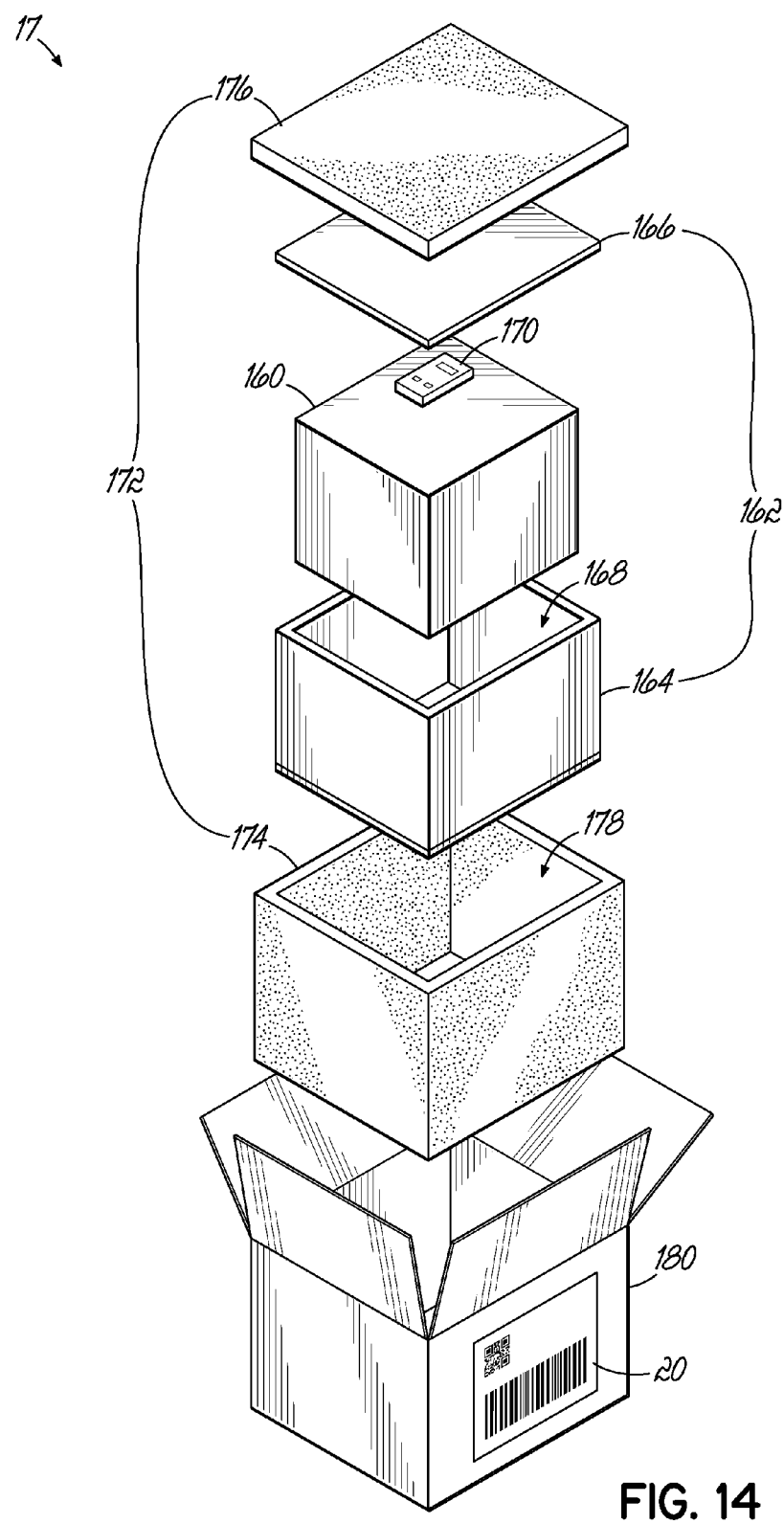
FIG. 14 is an exploded perspective view of the exemplary package of FIG. 1.

Referring now to FIG. 14, an exploded perspective view of an exemplary package 17 is provided. The package 17 includes a payload 160, which may be a container of samples that require a temperature controlled environment to remain viable or in a proper metabolic state, for example. The payload 160 may be placed in a cooling assembly 162 that includes an open sided container 164 and a top panel 166. When assembled, the cooling assembly 162 may define a cavity 168 that is configured to accept the payload 160. The cooling assembly 162 may include a phase-change material, such as water, that absorbs heat from and/or releases heat to the surrounding environment so as to maintain the temperature of the cavity 168 within a desired range. For example, a mixture including water in both liquid and solid phases may tend to maintain a temperature of 0° C. within the cooling assembly 162. To monitor the temperature of the payload 160, a tracking device 170 may be placed inside the cavity 168.

The payload 160 and cooling assembly 162 may be placed in a insulating assembly 172 that includes an open ended container 174 and top panel 176 formed from an insulating material, such as a closed-cell extruded polystyrene foam. Similarly to the cooling assembly 162, the insulating assembly 172 may define a cavity 178 configured to accept the cooling assembly 162. The assembled payload 160, cooling assembly 162, and insulating assembly 172 may then be placed in a suitable outer container 180, such as a corrugated fiberboard box, for shipping. The package 17 may thereby be configured to maintain a payload temperature within a desired range of temperatures for a desired amount of time. Prior to shipping the package 17, the receiving label 20 may be affixed to the outer container 180 in accordance with the embodiments of the present invention described above.

At the receiving end of the shipment, a user who wishes to unpack the container 17 may activate the mobile application icon 84 and scan the label 20 using the mobile device 12. In response to scanning the label 20, the mobile application 34 may receive data relating to the package 17 from the database 50 that includes unpacking instructions. Advantageously, by providing the instructions to the user via the mobile device, the user may receive unpacking instructions prior to opening the package 17, rather than having to open at least the outer container 180 to retrieve printed instructions.

Referring again to FIG. 12, if the package 17 conforms to the data displayed by the mobile application 34, the user may wish to unpack the package 17. To access unpacking instructions, the user may activate the unpacking instructions button 98. In response to activation of the button 98, the mobile application 34 may display the unpacking instructions 152 in the data display window 102. The unpacking instructions 152 may include both text and images, and may define a proscribed way to unpack the package 17. To this end, the instructions may include steps that describe where items within the package 17 are placed relative to one another, as well as a recommended unpacking order. For example, the instructions 152 may dictate that articles which need refrigeration are to be unpacked first and immediately placed in a refrigerator at a particular temperature. The instructions 152 may also instruct the user how to find, deactivate, and download data from the tracking device 170. In an embodiment of the present invention, the instructions may be provided one step at a time, with the user indicating that the displayed step has been completed prior to receiving the next step. The mobile application 34 may thereby track the unpacking process, and provide data to the database indicative of how the unpacking process was conducted. System users or the helpdesk may thereby be able to verify that a package was properly unpacked, or determine if an article was mishandled.

The unpacking instructions feature of the system 10 may facilitate complex payload arrangements in which articles are placed relative to each other so that each article is maintained in a different environment. For example, articles requiring lower temperatures could be arranged near the center of the package 17. Other articles less sensitive to temperature variations could be placed closer to an outer surface of the package 17, such as in a compartment external to the insulating assembly 172. Embodiments of the system 10 may thereby facilitate development of new ways of combining shipments into a single package 17, such as combining ambient and cold chain shipments. Moreover, because the instructions are stored in the database 50, the unpacking instructions may be modified based on the passage of time since the article was shipped. For example, the amount of time the package 17, or an article in the package, can be left unrefrigerated may be adjusted based on the amount of time that has passed since the package 17 was assembled. The unpacking order could also be adjusted base on how long the container has been in transit, or based on a predicted condition of articles in the package. For example, once it is determined that an article in the package 17 has likely gone bad, the unpacking instructions could be adjusted to reflect this determination.

While the present invention has been illustrated by the description of embodiments thereof, and while these embodiments have been described in considerable detail, it is not the intention of the applicant to restrict or in any way limit the scope of the appended claims to such detail. Additional advantages and modifications will readily appear to those skilled in the art. Therefore, the present invention in its broader aspects is not limited to the specific details of the representative apparatus and method, and illustrative examples shown and described. Accordingly, departures may be made from such details without departing from the spirit or scope of applicants' general inventive concept.

For example, although the system processes illustrated in FIGS. 3 and 6 are described above as generally linear sequences, persons having ordinary skill in the art will understand that system messages may be transmitted in different sequences or even concurrently. Moreover, additional functions and queries may be performed during various system processes. Embodiments of the present invention are thus not limited to performing the shown functions in a particular sequence, or storing data in a particular location. It should also be understood that the terms "query", "response", "confirmation", and/or "message" as used herein are considered interchangeable. Use of any one of these terms is therefore not intended to imply that any particular quality is associated with regard to type of signal being used to transmit or receive the "query", "response", "confirmation", and/or "message". Nor is any there to be any implication regarding the nature of the data conveyed by a signal based on the use of the term "query", "response", "confirmation", and/or "message" in describing said signal or the data conveyed thereby.

What is claimed is:

1. A method of providing instructions for handling a package requiring specialized handling, the method comprising:
   storing data relating to the instructions for handling the package in a database, wherein at least one property of the package is dependent on specialized handling of the package;
   associating a unique identifier with the data stored in the database, the unique identifier identifying the package;
   providing a machine readable code associated with the package, the machine readable code including the unique identifier;
   updating first data with additional data associated with the package during handling of the package, wherein the additional data includes additional instructions on handling the package that have been updated from the instructions initially provided with the data to adjust the specialized handling of the package to address a change to the at least one property of the package; and
   in response to the machine readable code associated with the package being scanned by a scanning device, transmitting the data relating to the instructions for handling the package from the database to a data receiving device.

2. The method of claim 1 wherein the data receiving device is the scanning device.

3. The method of claim 1 further comprising:
   embedding data identifying a communication link to the database in the machine readable code.

4. The method of claim 3 further comprising:
   scanning the machine readable code with the scanning device;
   extracting the unique identifier and the data identifying the communication link from the machine readable code in the scanning device; and
   transmitting a request from the scanning device to the database using the identified communication link, the request including the unique identifier.

5. The method of claim 4 further comprising:
   in response to receiving the request from the scanning device, generating a bill related to delivery of the package.

6. The method of claim 4 further comprising:
   receiving the data relating to the instructions for handling the package at the scanning device; and
   displaying the instructions on a user interface of the scanning device.

7. The method of claim 1 wherein the instructions forhandling the package include instructions on how to unpack the package.

8. The method of claim 7 wherein the package is a first package, and the unpacking instructions include an instruction to receive a second package before unpacking the first package.

9. The method of claim 7 wherein the package includes a first article having a first temperature requirement and a second article having a second temperature requirement different from the first temperature requirement.

10. The method of claim 9 wherein the unpacking instructions indicate that the first article is to be unpacked before the second article.

11. The method of claim 9 wherein the unpacking instructions indicate that the first article is to be placed in storage in an environment having a temperature within a temperature range meeting the first temperature requirement.

12. The method of claim 1 wherein the package contains an article, and the instructions include instructions on where the article is to be delivered, a protocol to be followed with the article, a test subject to receive the article, a study to which the article is related, a entity for which a study related to the article is being conducted, how the article is to be stored, or a description of the article.

13. The method of claim 1 wherein the request includes a first authorization code, the method further comprising:
   comparing the first authorization code to a second authorization code stored in the database; and
   only transmitting the data relating to the instructions for handling the package from the database to the data receiving device if the first authorization code matches the second authorization code.

14. The method of claim 1 further comprising:
   setting a flag in the database, the flag indicating that the package requires special handling; and
   in response to the flag being set in the database, generating a label including the machine readable code and affixing the label to the package.

15. The method of claim 14 wherein the flag is set in the database in response to a determination indicating that the package is one of the plurality of packages associated with a study.

16. The method of claim 1 wherein the machine readable code is a two dimensional bar code.

17. The method of claim 1 wherein the machine readable code is a one dimensional bar code, or a code embedded in a Radio Frequency Identity (RFID) tag.

18. The method of claim 1 further comprising:
in response to receiving the request, updating a transaction record to indicate the package identified by the unique identifier has been scanned.

19. The method of claim 18 wherein the transaction record is associated with a study involving an article in the package, so that the transaction record provides an indication of whether all articles related to the study have been received.

20. A system for providing instructions for handling a package requiring specialized handling, the system comprising:
a processor; and
a memory including program code that, when executed by the processor, causes the processor to:
store data relating to the instructions for handling the package in a database that is communicatively coupled to a global project management system;
associate a unique identifier with the data stored in the database, the unique identifier identifying the package;
provide a machine readable code associated with the package, the machine readable code including the unique identifier;
in response to the machine readable code associated with the package being scanned by a mobile device, transmit the data relating to the instructions for handling the package from the database to the mobile device, wherein the database is configured so that all data exchanged between the mobile device and the global project management system passes through the database.

21. The system of claim 20 further comprising:
a mobile device configured to scan the machine readable code, extract the unique identifier from the machine readable code, transmit the request to the database, receive the data relating to the instructions for handling the package, and display at least a portion of the data on the user interface.

22. The device of claim 21, wherein the processor is further configured to generate a bill related to delivery of the package in response to receiving the request from the mobile device.

23. A machine code reading device comprising:
a processor; and
a memory including program code that, when executed by the processor, causes the processor to:
scan a machine readable code associated with a package, wherein at least one property of the package is dependent on specialized handling of the package;
extract data from the machine readable code, the data including a unique identifier and data identifying a communication link to a database;
transmit the unique identifier to the database via the communication link;
receive a response from the database, the response including additional data associated with the unique identifier relating to instructions for handling the package, wherein the additional data includes additional instructions on handling the package that have been updated from the instructions initially provided by the data to adjust the specialized handling of the package to address a change to the at least one property of the package; and
display at least a portion of the data and the additional data relating to the handling of the package so that the adjusted specialized handling of the package is displayed on a user interface of the machine code reading device.

24. The device of claim 23 wherein the data relating to instructions for handling the package includes data relating to instructions on how to unpack the package.

25. The device of claim 23 wherein the program code is further configured to cause the processor to direct all communication relating to data extracted from the machine readable code to the database.

26. The device of claim 23 wherein the program code is further configured to cause the processor to:
determine an authorization code based on the data extracted from the machine readable code;
transmit the authorization code to the database; and
receive a response from the database indicating if the authorization code is valid, wherein
the reading device only displays the at least a portion of the data relating to handling of the package if the authorization code is valid.

27. The device of claim 23 wherein the program code is further configured to cause the processor to:
track the use of the machine code reading device; and
transmit data indicative of the tracked use to the database.

28. The device of claim 27 wherein the program code is further configured to cause the processor to:
request the user provide an indication via the user interface confirming that at least a portion of the handling of the package has been performed, the data indicative of the use of the device including data indicative of the user's confirmation.

29. The device of claim 28 wherein the at least a portion of the handling of the package includes receiving the package.

30. The device of claim 23, wherein the processor is further configured to embed data identifying a communication link to the database in the machine readable code.

* * * * *

UNITED STATES PATENT AND TRADEMARK OFFICE
CERTIFICATE OF CORRECTION

| | | |
|---|---|---|
| PATENT NO. | : 9,721,226 B2 | Page 1 of 1 |
| APPLICATION NO. | : 13/956972 | |
| DATED | : August 1, 2017 | |
| INVENTOR(S) | : Minogue et al. | |

It is certified that error appears in the above-identified patent and that said Letters Patent is hereby corrected as shown below:

In the Specification

In Column 11, Line 50, change "receiving device, such a desktop computer." to --receiving device, such as a desktop computer.--.

In Column 14, Line 2, change "in a insulating assembly" to --in an insulating assembly--.

In Column 15, Line 21, change "spirit or scope of applicants' general" to --spirit or scope of Applicants' general--.

In Column 15, Line 37, change "Nor is any there to be any" to --Nor is there to be any--.

In the Claims

In Claim 7, Column 16, Lines 25-26, change "wherein the instructions forhandling" to --wherein the instructions for handling--.

In Claim 12, Column 16, Line 47, change "a entity for which a study related" to --an entity for which a study related--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*